United States Patent [19]

Collender

[11] 4,158,487

[45] Jun. 19, 1979

[54] STEREOSCOPIC REAL IMAGE SCANNING REPRODUCTION METHOD AND APPARATUS

[76] Inventor: Robert B. Collender, 709 Patterson Ave., Glendale, Calif. 91203

[21] Appl. No.: 878,990

[22] Filed: Feb. 17, 1978

[51] Int. Cl.² .................... G03B 19/18; G03B 21/32
[52] U.S. Cl. ........................ 352/38; 352/43; 352/53; 352/58; 352/40; 352/86
[58] Field of Search .................. 352/43, 53, 57, 58, 352/38, 40, 86

[56] References Cited

U.S. PATENT DOCUMENTS

| | | | |
|---|---|---|---|
| 2,002,090 | 5/1935 | Ives | 352/53 |
| 2,822,720 | 2/1958 | Douglas | 352/53 |
| 2,968,211 | 1/1961 | Douglas | 352/53 |
| 3,225,651 | 12/1965 | Clay | 352/58 |
| 3,463,581 | 8/1969 | Clay | 352/58 |
| 3,479,111 | 11/1969 | Gabor | 352/58 |
| 3,482,913 | 12/1969 | Glenn | 352/58 |
| 3,542,556 | 11/1970 | Jones | 352/58 |
| 3,815,979 | 6/1974 | Collender | 352/58 |
| 4,089,597 | 5/1978 | Collender | 352/58 |

*Primary Examiner*—Monroe H. Hayes

[57] ABSTRACT

My invention relates to photographing scenes with standard motion picture photographic equipment where multiple views of a subject are photographed while the subject rests on a moving turntable and the stationary camera has its optical axis pointed at the turntable rotation axis or where the subject is stationary and the camera effectively moves in an arc about an axis located between the camera and scene.

The surface of the processed film (or other appropriate media) is arrayed in a vertical plane and constrained to move horizontally around a portion of a circle. Film images are scanned by a light source and radially projected in a direction away from a vertical rotation axis. Concentric with the vertical axis are the semi-specular screen of radius R and the scanning projector circle of radius close to R/3. The screen reflects projected light in a horizontal plane and scatters projected light in a vertical plane. The film is rapidly scanned by the projector and the images are projected sequentially while sweeping horizontally over the screen when the projector is between the vertical axis and the screen. At any instant, all projected rays reflected from the screen return to a vertical aerial exit slit along the projector's optical axis on the opposite side of the vertical axis with respect to the scan projector and on a scan circle radius about equal to R. The exit slit scan cycle repeats at short time intervals so as to avoid flicker.

2 Claims, 18 Drawing Figures

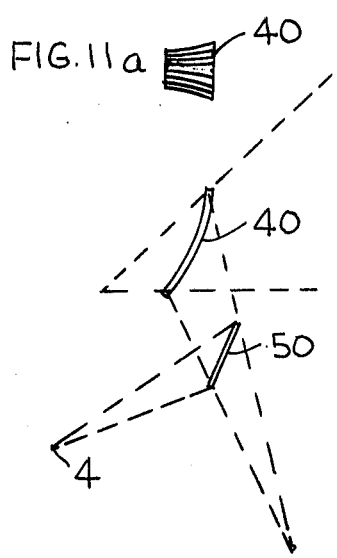
FIG. 11a
FIG. 11b
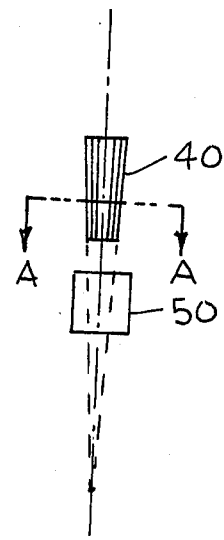
FIG. 11c
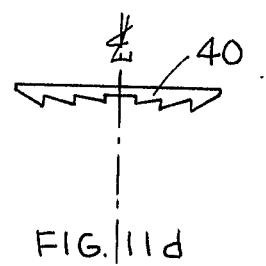
FIG. 11d

STEREOSCOPIC REAL IMAGE SCANNING REPRODUCTION METHOD AND APPARATUS

CROSS-REFERENCES TO RELATED APPLICATIONS

With reference to my U.S. Pat. No. 3,178,720 of Apr. 13, 1965, my new invention is significantly different. U.S. Pat. No. 3,178,720 describes an incremental rotation of the camera image about the optical axis as the camera photographs successive pictures around the scene. The reproduced pictures were incrementally rotated and swept 360 degrees. The pictures were projected on a translucent screen at the end of a revolving drum at right angles to its rotation axis and pictures were imaged by a revolving mirror.

In my new invention there is no incremental rotation of the camera image about an optical axis as the camera successively photographs the scene. The reproduced pictures in my new invention are not incrementally rotated.

In U.S. Pat. No. 3,178,720, the film is moved rapidly past a fixed projection point. In my new invention, the processed motion picture film can be stationary for a stationary reproduction, or can move at the conventional rate of 24 frames per second as for a moving picture reproduction. A very fast optical scanner passes by the film and selectively projects pictures on the screen in a sweeping fashion.

In my new invention the pictures are not projected onto a translucent screen at the end of a revolving drum but instead the pictures are sequentially swept across a semi-specular curved screen and not associated with a drum.

With reference to another of my U.S. Pat. No. 3,324,760 of June 13, 1967, my new invention is also significantly different. U.S. Pat. No. 3,324,760 describes a radial high frame rate sweeping projector that projects onto the inside surface of a surrounding concentric cylindrical screen. A thin vertical viewing slit followed the laterally shifting picture. The slit locus was concaved to the observer. Several radial projectors were employed that projected contiguous pictures that both swept and changed perspective with time. A real vertical slit in an obturative drum was used to force the observer's eyes to see various vertical slices of picture information until each eye had an entire picture scanned for it. Eyes were forced to occupy space on the opposite side of the slit locus with respect to the cylindrical screen.

The viewing slit in my new invention is not constructed from a physical opaque drum but instead is formed by diverting the screen return light to a horizontally sweeping vertical exit pupil (referred to as an aerial slit in the detailed description of the drawings). The slit locus is convexed to the viewer and the observer's eyes can be located either between the screen and aerial slit, on the aerial slit or beyond the aerial slit as measured from the front reflective surface of the screen.

With reference to another of my U.S. Pat. No. 3,815,979 of June 11, 1974, my new invention is also significantly different. In Pat. No. 3,815,979, the camera assumed sequential positions along a circular arc while the camera at each location had its optical axis aimed toward a point on said circular arc but on the opposite side relative to the camera positions as viewed from a plan view. In the stereoscopic image reproduction a fixed location high frame rate projector was used to project onto a fixed screen location the sequential pictures photographed by the successive camera locations. The screen geometry made of vertical rotating elements, swept the pictures in a manner such that each frame's optical axis passed through the aiming point replica of the photographing aim point. The projection aim point was located in the center of a curved screen. The successively projected different views of the scene were all aimed at the fixed screen position or aim point.

My new invention does not use an aim point on the scan circle in either the phtographing or image reproduction. In addition the image reproducer uses a new rapidly scanning optical system that causes a swept series of successive views of the scene to move across the semi-specular and semi-circular screen. The screen is stationary and each frame's projected optical axis passes through the scan projector's rotation axis while all of the light from the reflected image leaving the screen passes through the projector's optical axis on the opposite side of the rotation axis from the screen but contained within the extended screen concentric circle. The projection system generates a rotationally and horizontally moving vertical aerial exit slit through which the observer sees the reproduced scene. The scene is in motion when the film is in motion. Both still and moving scenes provide stereoscopic viewing without optical aids at the observer's eyes.

In my U.S. Pat. No. 4,089,597 of May 16, 1978, the optical axis of the camera tanslated parallel to itself in photographing the scene. In the reproduction, the reflection of the projector's optical axis from the semi-specular screen translated parallel to itself. The projector effectively moved over the same locus as the vertical aerial exit viewing slit. In my new invention, the camera and projector optical axis are effectively rotating about an axis and are radial with respect to that axis. The projector moves in a scan circle having a radius close to one-third of the screen radius. The aerial slit moves in the same radius as the screen.

BRIEF SUMMARY OF THE INVENTION

My invention relates to a system of recording and stereoscopic viewing of scenes and particularly to a method and means for accomplishing this purpose without viewing aids at the eyes of the observers.

Man has sought for decades to reproduce scenes in stereoscopy without the use of viewing aids at the eyes of the observers and in a manner such that a number of persons might view such scenes at one time and without restriction as to their various individual positions.

I have found that by presenting a relatively large number of related images of the scene to be viewed behind a rapidly moving vertical optically generated aerial slit aperture the parallax thus occurring prevents one eye of each observer from seeing what the other eye sees at any and every instant of time. The synthetic aperture being in motion, each eye sees a complete image within a short interval of time. I make this interval within the persistence of vision for human observers. The brain fuses the two eye observations into a single stereoscopic view image, as my practical results predicate.

Accordingly, I am able to present a stereoscopic view of a scene to one or any reasonable number of viewers. If any or all of the viewers walk around my apparatus they will see the scene in different aspect, just as though they walked around the same scene in real life.

If the scene is reproduced from a series of stationary transparencies taken around the scene according to my method and apparatus the objects within the scene are stationary and a still stereoscopic picture is obtained. If the scene is reproduced from a series of moving transparencies photographed by a motion picture camera such that a relative motion occurs between the camera and scene and the images are reproduced according to my invention, stereoscopic motion pictures are obtained. Motion within the scene will be included and reproduced in the stereoscopic motion picture as well as the scene and camera relative motion.

Considering my system in greater detail the perspective that one eye of any observer sees is made up of discrete vertical lines of image information taken at discrete instants of time. At these same instants of time the other eye of that observer sees a completely different perspective. The net perspective for the two eyes is different, of course, because the eyes are not coincident in space, but are spaced apart horizontally, as is well known. Considering the image as an entity, it is dissected in time and in space.

An object of my invention is to provide viewing of three dimensional images without the use of viewing aids at the eyes of the observer.

Another object is to provide a stereoscopic system in which various perspectives of the scene viewed may be obtained by changing one's position around the reproducing apparatus.

Another object is to provide a basic stereoscopic motion picture method applicable to known and existing forms of image acquiring processes.

Another object is to provide means for reproducing stereoscopic images that are relatively rugged and are suited to retain adjustments in practice.

Other objects will become apparent upon reading the following detailed specification and upon examining the accompanying drawings, in which are set forth by way of illustration and example certain embodiments of my invention.

BRIEF DESCRIPTION OF ALL DRAWINGS

FIG. 11a shows the plan view of Fresnel mirror

FIG. 11b shows the side view of the aberration corrector

FIG. 11c shows the front view of the aberration corrector

FIG. 11d shows the cross section of the Fresnel mirror

DETAILED DESCRIPTION OF DRAWINGS

Figure 1:
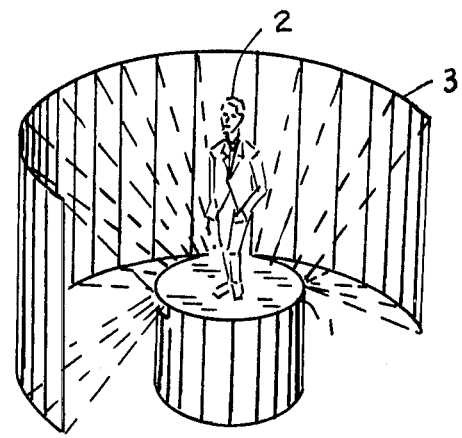
FIG. 1 shows a perspective of the reproducer according to my invention.
Figure 2:
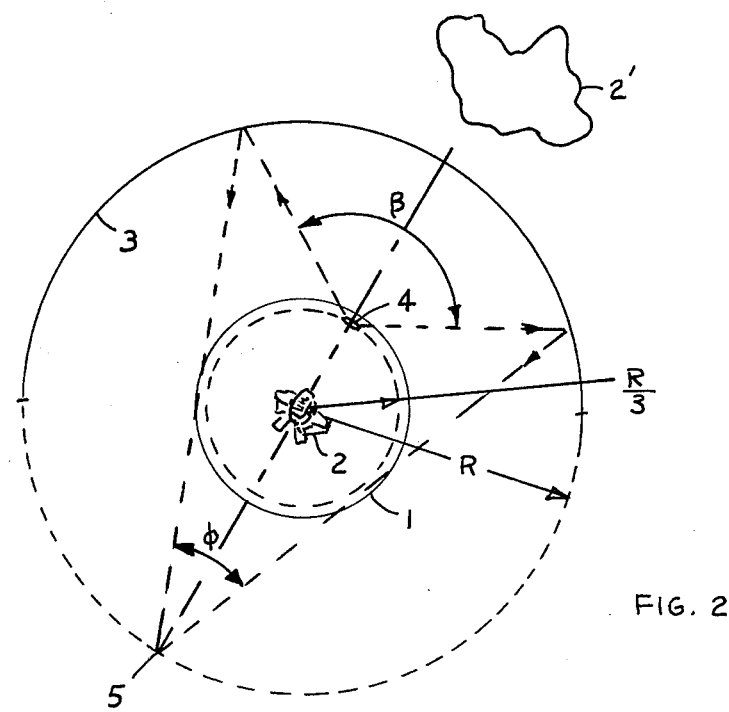
FIG. 2 shows the geometry to determine image platform size in the reproducer

FIG. 1 shows the stereoscopic reproduction system. In FIG. 1, the relative size of central platform 1 on which the spatial image 2 appears can be compared with the diameter of the cylindrical screen 3. In FIG. 2, the platform 1 contains a scan projector 4 which has an effective lens node rotating at a radius of approximately one-third that of screen 3. Scan projector 4 repeats its circular scan in excess of the flicker rate for observers. One or more projectors may be used in the scan projector provided the scan repetition period of successive projectors remains equal and approximately equal to 20 milliseconds. This corresponds to a scan repetition rate of 50 times per second. In FIG. 2, the projection angle $\beta$ is 3 times the angle $\phi$ subtended at the vertical aerial exit slit 5. The central image 2 size limits relative to screen 3 are determined by image reflected ray limits from screen 3 to slit 5. If the scene is photographed with a moving camera 10 as shown in FIG. 3, a reproduction of image 2' will appear beyond image 2 as shown in FIG. 2 for scene objects 11 and 11' respectively in FIG. 3.

Figure 4:
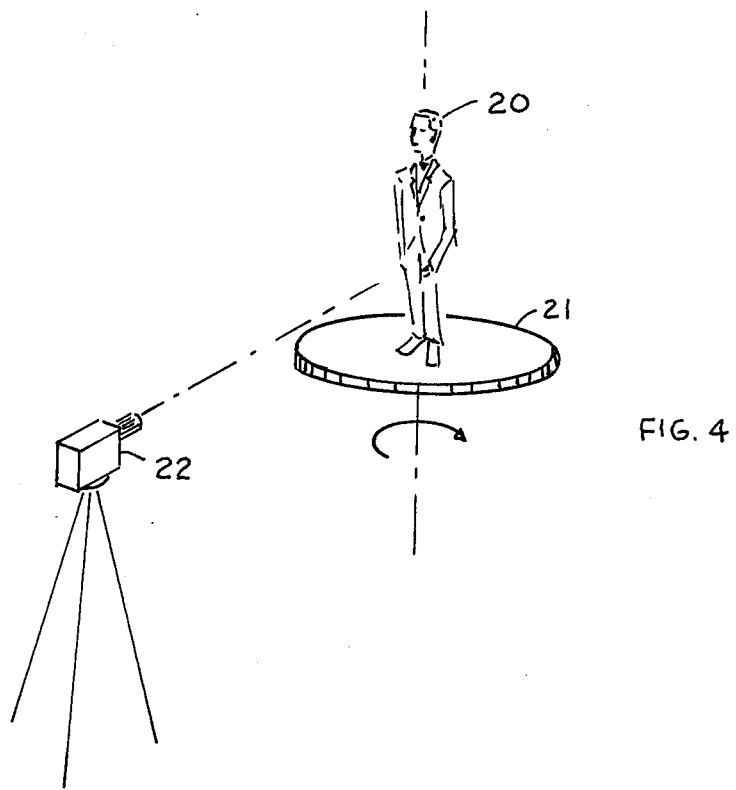
FIG. 4 shows photography of a subject on turntable with stationary camera according to my invention

In FIG. 4, if scene object 20 on turntable 21 is photographed by stationary camera 22, no scene objects outside of turntable 21 can be used unless they appear as a flat image beyond the central spatial image 2 of FIG. 2.

In FIG. 2, if the horizontal angle $\phi$ subtended by screen 3 image reflected rays is 30 degrees, the central image platform 1 diameter is 26% of screen 3 diameter. If $\phi$ is 40 degrees, the platform 1 diameter is 34% of screen 3 diameter. Screen 3 can be constructed from a horizontally polished stainless steel sheet with about 240 lines per inch.

Figure 3:
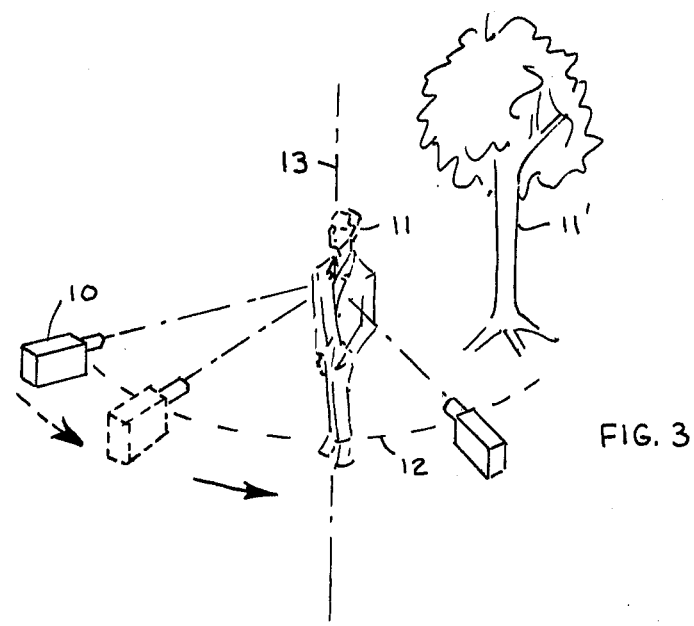
FIG. 3 shows photography of a natural scene with the camera rotated in a horizontal arc about an axis located between camera and scene according to my invention.

In FIG. 3, to make both foreground 11 and 11' appear stereoscopic, camera 10 should move through space in a horizontal circular locus 12 with camera 10 pointed toward the center of rotation 13. The camera type would be motion picture with the option of single frame advance. For stationary stereoscopic scenes, somewhere between 20 and 40 pictures are taken over a 180 degree angle of relative scene movement. The camera's picture frames can be advanced by sensing the angular movement in the scene. For motion pictures, the camera can be placed in a motion picture mode while the scene changes.

Figure 5:
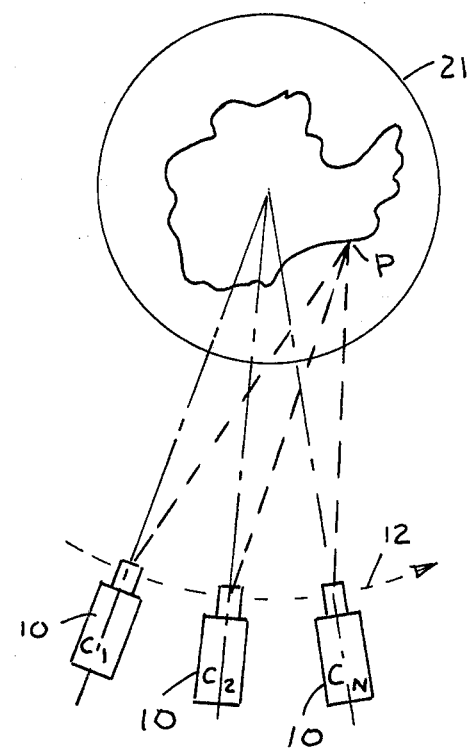
FIG. 5 shows a geometric construction of an arbitrary scene point from a camera moving in an arc according to my invention.

FIG. 5 shows an arbitrary scene 20 on a moving turntable 21. The camera 10 is shown moving in an arc 12 for simplicity of illustration while depicting relative motion in azimuth between camera 10 and scene 20. Camera 10 is shown at positions $C_1$, $C_2$ and $C_n$ for three different instants in time. A reference point P on the scene is shown in FIG. 5 in order to determine its reconstruction as image point $P_i$ in FIG. 6

Figure 6:
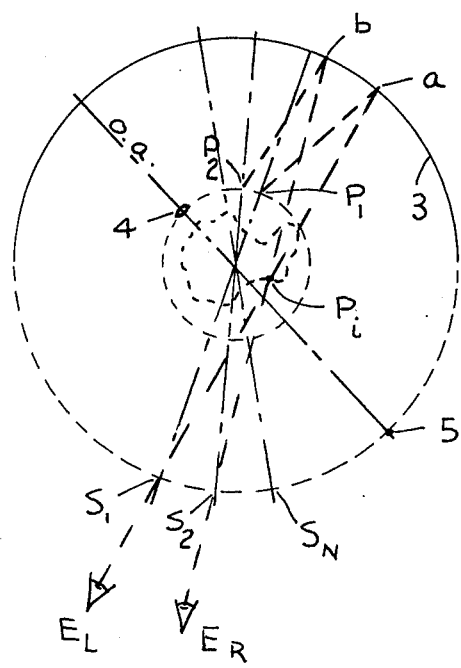
FIG. 6 shows a geometric reconstruction of the image of the object point in the scene of FIG. 5.

In FIG. 6, the projector 4 moves in a scan circle (i.e. having a diameter about equal to one-third of screen 3 diameter). Scan projector 4 sequentially and radially projects the pictures photographed. All rays leaving projector 4 and reflecting from screen 3, return to aerial slit 5 (by specular reflection in a horizontal plane and by scatter in a vertical plane) and meet at a point on the radial optical axis (o.a.). In order for an eye to see the image point, the eye, the aerial exit slit and the intercepted projection of the image point on the screen, must all line up. In FIG. 5, reference point P on the scene is constructed as $P_i$ for the observer's left eye $E_L$ in FIG. 6 by means of projector 4 at position $P_1$ releasing a projected ray to point a on screen 3. Point a reflects through $P_i$ (the image of reference point P) to aerial slit 5 at $S_1$ and into $E_L$. Reference point P on the scene of FIG. 5 is constructed as $P_i$ for the observer's right eye $E_R$ in FIG. 6 by means of projector 4 at position $P_2$ releasing a projected ray to point b on the screen 3. Point b reflects through $P_i$ to $S_2$ and into $E_R$.

Since the projector is constantly moving in FIG. 6, the projected images on the screen sweep horizontally in a radial fashion over the screen while changing perspective. The projector's optical axis (o.a.), the aerial exit slit 5 and the center of rotation 0 remain aligned. Because of the movement of the picture, the aerial slit 5 should be of small width to assure good resolution.

Figure 7:
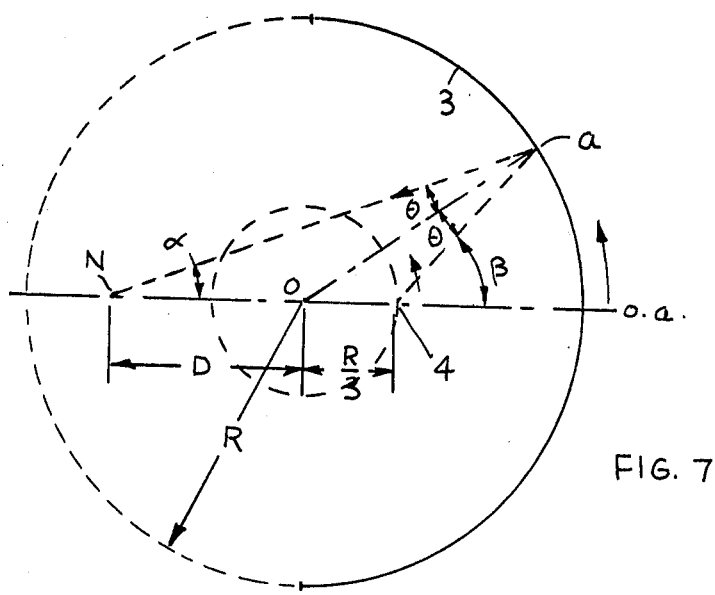
FIG. 7 shows a plan view of the principle items utilized in the image reproducer without the application of an aberration corrector which will move the aerial exit slit to the concentric circle including the screen.

FIG. 7 shows the basic principle in the reproducer operation. Scanning projector 4 rotates about the scan center 0 at a radius "approximately" equal to one-third of the cylindrical screen 3 radius. Screen 3 has spectral characteristics in the horizontal and therefore reflects an incident ray at point a on screen 3 to the aerial slit position N coincident with the optical axis (O.A.). Without correction for spherical aberration, the distance D varies with the projection angle $\beta$. It can be shown mathematically that $\alpha = \beta - 2\theta$ and that $\sin \beta = 3 \sin \theta$ and that $D = R \sin \theta / \sin \alpha$. Table 1 below tabulates various values of D for corresponding values of $\beta$. The value of D should be constant and equal to R for all values of $\beta$ (the projection half-angle) in order that all rays projected from scanning projector 4 at any instant will return to the aerial exit slit 5 of FIG. 2 located on the circle that includes cylindrical screen 3.

Table 1

| Effects of uncorrected projection aberration | |
|---|---|
| $\beta$ | D |
| 0 | R |
| 10 | .987R |
| 20 | .948R |
| 30 | .888R |
| 40 | .814R |
| 50 | .732R |
| 60 | .648R |

Figure 8:
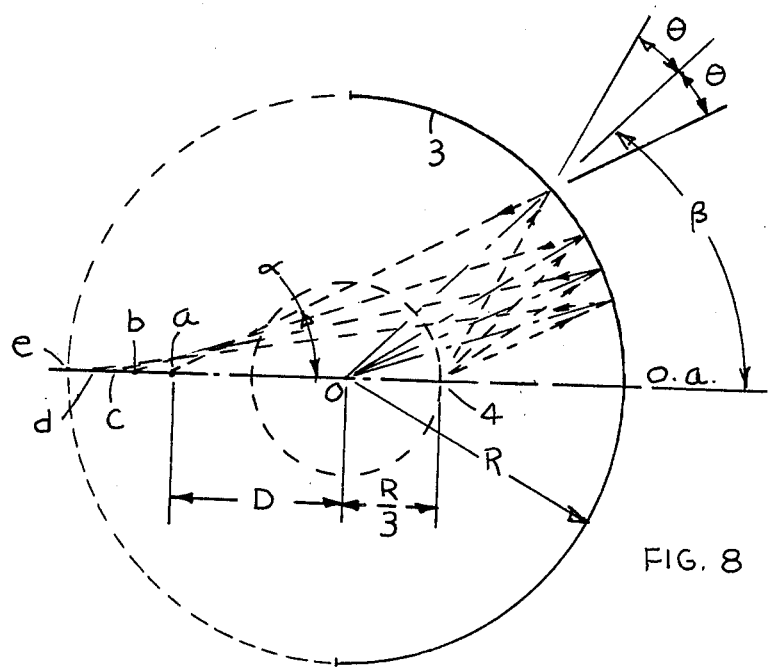
FIG. 8 shows the effects of uncorrected projection aberration when scan projector maintains the scan circle at one-third screen radius for all projection ray angles.

FIG. 8 shows a scale drawing of the variable exit slit location with respect to projection angle for a projection system which has not been corrected for spherical aberration.

If the observer's eye were located at aerial exit slit 5 position of FIG. 2, the eye should see the entire picture on the screen and of uniform intensity with open aperture in the projector. In FIG. 8, the exit slit position shifts from point a to a point e along optical axis (o.a.) for angle $\beta$ maximum at 60 degrees to minimum at zero degrees. An eye located at E would not see light from the sides of the picture. This problem of spherical aberration in the positioning of the aerial exit slit must be corrected before this stereoscopic reproducer imbodiment can be useful.

Figure 9:
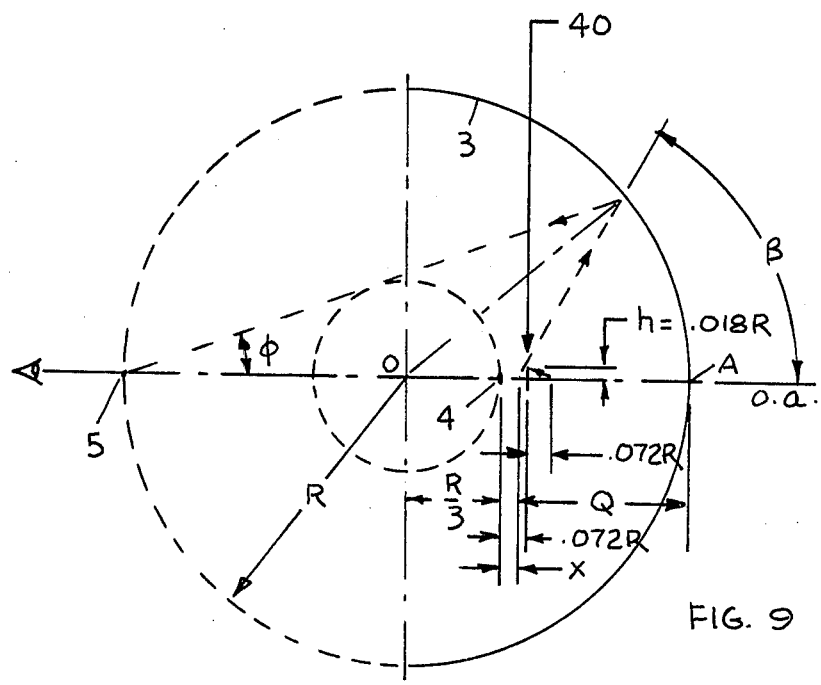
FIG. 9 shows a plan view of the projection geometry with spherical aberration corrector in the reproducer according to my invention.
Figure 10:
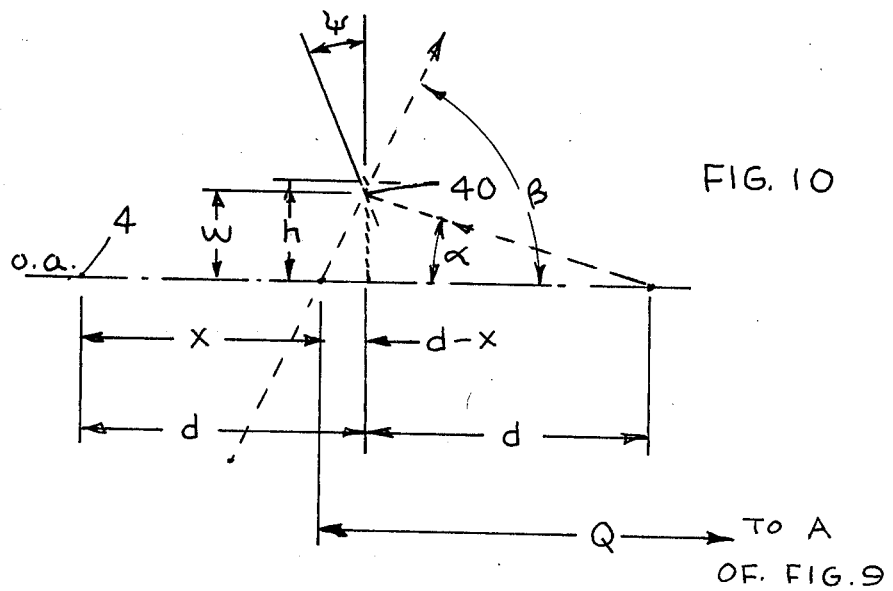
FIG. 10 shows a plan view detail drawing of the principles involved in correcting spherical aberration in the formation of the aerial exit slit.

In FIG. 9, an aberration corrector is inserted into the projection system. The details of the aberration corrector are shown in FIG. 10. The projection system is constructed to position the apparent projection lens node 4 at various distances Q measured from screen 3 apex A along the optical axis (as shown in FIG. 9 and FIG. 10) for various angles of $\beta$.

If aerial exit slit 5 in FIG. 9 is to remain on the aerial slit locus for all angles of $\beta$ from zero to 60 degrees, angle $\phi$ will always be $\beta/3$ and certain mathematic relationships can be derived. It can be shown that Q, in FIG. 9, has the following formula:

$$Q = \frac{R(\sin 3\phi - \sin \phi)}{\sin 3\phi}.$$

In order to develop the required parameters for the Fresnel mirror 40, some relationships from FIG. 10 are evident: $\psi = (\beta - \alpha)/2$; $\beta = \tan^{-1} w/d - x$; $\alpha = \tan^{-1} w/d$; since $\beta = 3\phi$, $w = (d-x) \tan 3\phi$. From FIG. 9, $$x = \frac{2R}{3} - \frac{R(\sin 3\phi - \sin \phi)}{\sin 3\phi}$$

and the formula for the Fresnel mirror 40 will show the $$\frac{3\phi - \tan^{-1} \frac{(d-x)}{d} \tan 3\phi}{2}$$

where w is variable from 0 to 0.018 R and d is fixed at 0.072 R.

Table 2 tabulates values of Q and x in terms of the screen radius R for various values of angle $\phi$.

Table 2

| | Required shift in apparent position of projection lens with variation in view angle. | | |
|---|---|---|---|
| $\phi$ | Q | x | x (inches) for R = 3 feet |
| 2 | .666R | .001R | .036 |
| 5 | .663R | .004R | .144 |
| 7.5 | .659R | .008R | .288 |
| 10 | .653R | .014R | .504 |
| 15 | .634R | .033R | 1.19 |
| 20 | .605R | .062R | 2.23 |

Selecting a two foot diameter for the spatial image pedestal, screen 3 radius is 3 feet, x=2.23" at $\beta=60$ degrees and d is selected at 2.6" to make $w_{max}=0.64$" and $\alpha_{max}=13.8$ degrees in FIG. 10. Therefore the total horizontal projection angle is 27.6 degrees in order to arrive at a 120 degree horizontal angle projected onto screen 3 with correction for slit position aberration.

FIG. 11 shows four views of the special Fresnel mirror corrector 40. FIG. 11a shows a plan view of Fresnel mirror 40. FIG. 11b shows a side elevation of aberration correction components. FIG. 11c is a front view of FIG. 11b. FIG. 11d is a cross section A—A of Fresnel mirror 40 in FIG. 11c. The real projection lens 4 throws the picture onto screen 3 via flat folding mirror 50 and the Fresnel mirror 40. In FIG. 11b, the vertical projection angle is about 53 degrees so that in FIG. 12, an eye E located at aerial slit 5 would observe the picture height subtend an angle of 26 degrees.

Figure 12A:
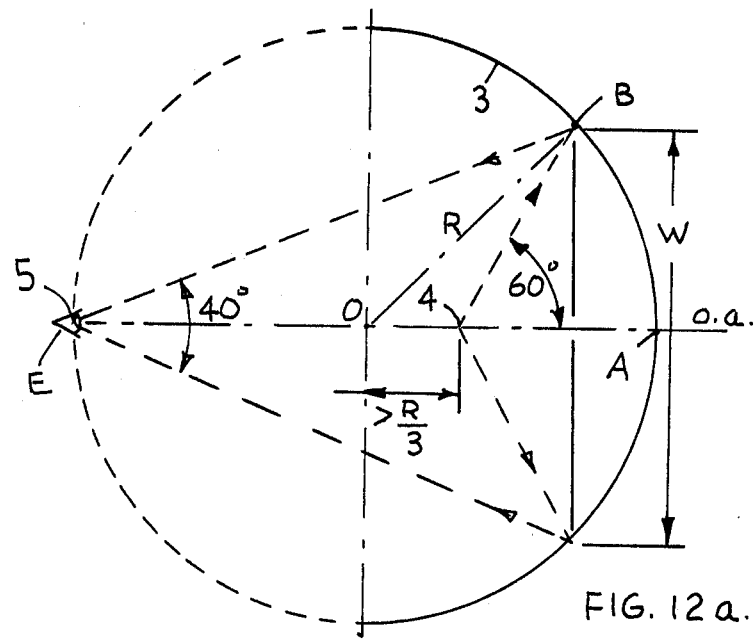
FIG. 12a shows the plan view of the projection geometry

FIG. 12a shows a plan view of the projection geometry. The projector 4 to screen 3 distance is closer along the optical axis (o.a.) than for extreme rays and the picture tends to pincushion distort. This tendency is corrected by slightly bowing the central portion of Fresnel mirror corrector 40 (reference FIG. 11c and d). To determine the image height at screen 3, an observer's eye E stationed at serial slit 5 should see a picture on the screen having an aspect ratio of 3 high to 4 wide. From FIG. 12a, the total width of a 120 degree projected picture is 1.286 R and the height should then be 0.965 R.

Figure 12B:
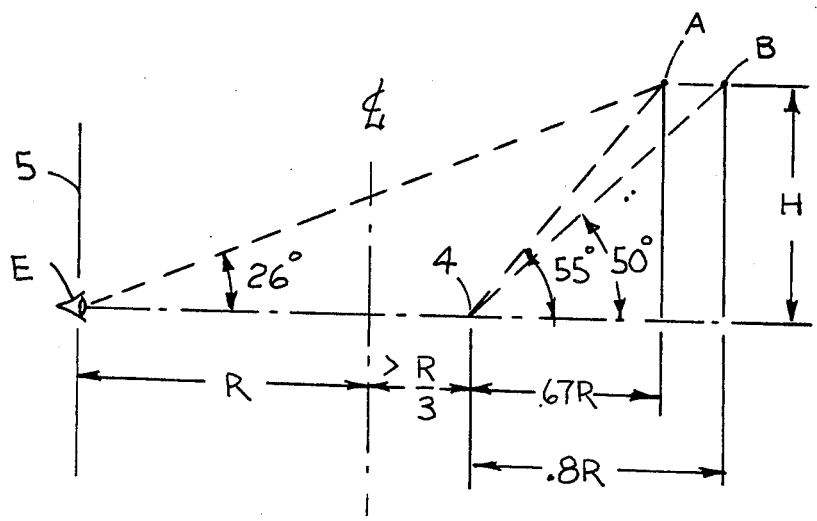
FIG. 12b shows the side view of the projection geometry

FIG. 12b shows a side elevation of the projection geometry. The vertical projection angle is shown increasing from 50 degrees to 55 degrees at the optical axis in order to overcome pincushion distortion.

Figure 13A:
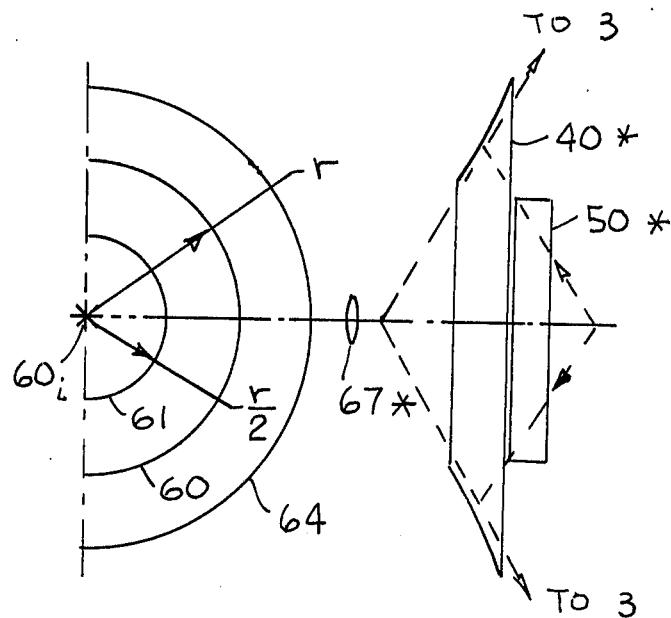
FIG. 13a shows the plan view of the film scanner
Figure 13B:
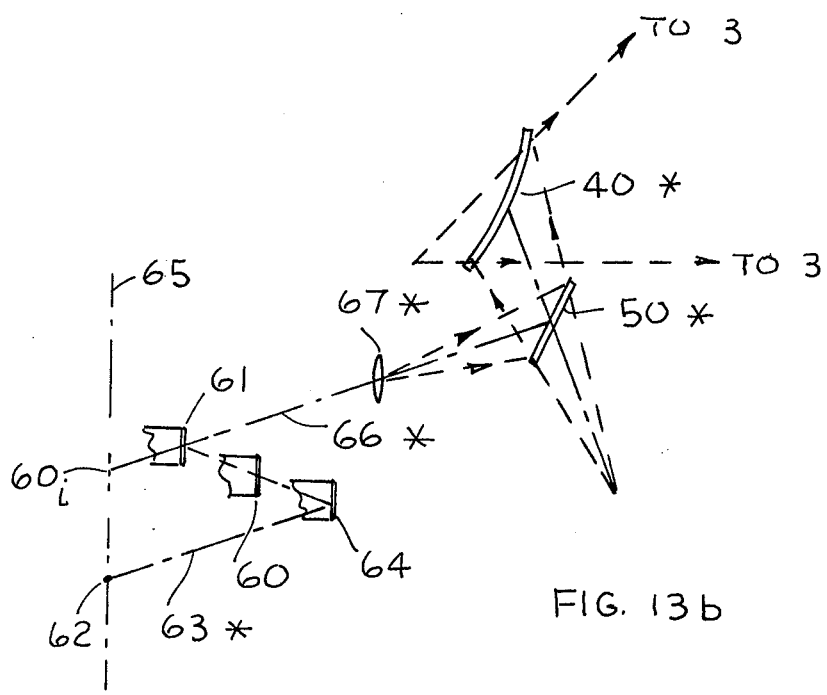
FIG. 13b shows the side view of the film scanner

FIG. 13 is only representative of the film scanner and relative sizes and angles are not necessarily maintained in order to diagrammatically portray the operation. The plan view of the film scanner system of FIG. 13a should be studied with the film scanner side elevation view of FIG. 13b. In FIG. 13a, the 180 degree film arc 60 is shown at radius r while a multi-segment mirror drum 61 of radius r/2 images each of the film frames at the drum center 0. The radially distributed (20 to 40) picture frames $60_i$ at the drum center 0, are illuminated via a central lamp 62, relay condenser optics 63 and a cylinder mirror 64 concentric with rotation axis 65. Additional relay projection optics 66 project the film images onto screen 3 via folding mirror 50 and special Fresnel spherical aberration corrective mirror 40. Those items which are on the scanner are shown with an asterisk.

In FIG. 13b, the projection lens 67 is shown parallel to film 60 and screen 3 in order to aid in eliminating projected keystone distortion.

There are several options in the operation of the film scanner. The film 60 can be held stationary and mirror drum 61 replaced with fixed mirror segments occupying a half-circle. A stationary 3-D scene would be projected. Film 60 could then be advanced 20 to 40 frames and again stopped to look at another stereoscopic scene. If stereoscopic movies are desired, the stationary mirror segments could again be used but during the time the scanner is not scanning over the 180 degree screen, film 60 could be advanced one frame. The motion picture intermittent advance rate would be 24 frames per second and the scanner would make 2 passes while the frame is stationary to give a 48 Hz refresh rate. To avoid intermittent film advance, a "mirror drum" image motion compensator 61 (having mirror segments equally spaced around the whole drum) could be used in place of the fixed mirror segments. Film 60 would move continuously and any given film frame would remain opposite a corresponding mirror segment over the 180 degree excursion.

Having thus fully described my invention and the manner in which it is to be practiced, I claim:

1. A method or recording and reproducing stereoscopic views for observation by plural observers without visual aids at the eyes of said observers, comprising:
    photographing multiple sequential views of a scene from a motion picture camera in a manner that the optical axis of the camera effectively rotates about a point in the scene; reproducing said views sequentially by projecting the views from a scanning projector onto a stationary concaved screen; said scanning projector being positioned, during the projection of successive views, at successive positions along the arc of a projection circle; said screen and projection circle being concentric about a common vertical axis; the optical axis of said projector always pointing away from said vertical axis so as to project said views to said screen located on the same side of the circle as said projector; said screen being stationary and comprised of horizontal corrugated ridges to vertically scatter incident light rays from said projector; said projector's effective lens node so corrected in location along the optical axis of said projector for horizontal projection angles that rays projected from said projector at one of said successive positions will reflect from said screen to pass through a vertical aerial exit slit; said slit being parallel to said vertical axis and on an extension of the scanning projector optical axis and at a point on the opposite side of said vertical axis from said scanning projector position; said screen so curved that the picture projected from said projector at one of said successive positions may be viewed in its entirety by an eye located anywhere along said slit; and the scanning rate of said projector being at a rate sufficient to be within the period of persistence of vision of an observer.

2. A construction for displaying motion pictures stereoscopically to observers situated in front of the viewing screen of said construction, said construction including:
    a reflective concaved viewing screen comprised of horizontal corrugated ridges, one or more projectors rotating about a vertical axis while projecting a sequence of pictures onto said screen, said projector optical axis directed away from said vertical axis, a multi-facet mirror drum concentric with said vertical axis, motion picture film constrained to a circular film guide, having axis coincident with said vertical axis, each sequential picture frame of said film separately imaged in a separate facet of said mirror drum such that all virtual images of said film frames are formed at said vertical axis, said film either stationary, intermittently moving or continuously moving with respect to the rapid scan of said projector, said concaved screen reflecting said sequential views projected by said projector to a horizontally moving vertical aerial exit slit at a greater radius than said scanning projector and on the opposite side of said vertical axis from said scan projector, said slit rotating at the same angular velocity as said projector.

* * * * *